XR 3,174,120 CROSS REFERENCE SEARCH ROOM

TX 89225

March 16, 1965 H. A. BROUNEUS 3,174,120

ULTRASONIC DELAY LINE HAVING MEANS TO REDUCE THIRD-TIME ECHO

Filed April 18, 1960 2 Sheets-Sheet 1

INVENTOR.
HAROLD A. BROUNEUS

BY
Clarence R. Patty, Jr.
ATTORNEY

3174120
OR IN 333/30R

ULTRASONIC DELAY LINE HAVING MEANS TO REDUCE THIRD-TIME ECHO

Filed April 18, 1960 2 Sheets-Sheet 2

INVENTOR.
HAROLD A. BROUNEUS
BY
Clarence R. Patty, Jr.
ATTORNEY

United States Patent Office 3,174,120
Patented Mar. 16, 1965

3,174,120

ULTRASONIC DELAY LINE HAVING MEANS TO REDUCE THIRD-TIME ECHO

Harold A. Brouneus, Painted Post, N.Y., assignor to Corning Glass Works, Corning, N.Y., a corporation of New York Filed Apr. 18, 1960, Ser. No. 22,792
12 Claims. (Cl. 333—30)

This invention relates to ultrasonic solid delay lines and more particularly to a means for reducing spurious responses in an ultrasonic solid delay line.

In the ultrasonic solid delay line art, one of the most difficult spurious responses to suppress is that response which is known as the "third-time signal." This third-time signal may be defined as the signal that arrives at the output transducer of a delay line at three times the desired delay time. It occurs primarily because a portion of the transmitted signal, after having traversed the prescribed delay line path, arrives at the output facet at an angle normal thereto and is then reflected back along the same path that the original signal traversed. When this signal, which has traversed the delay line in a reverse path, reaches the input transducer it again is reflected along the same path previously traversed two times to arrive at the output transducer with three times the delay of the first-received signal.

The reduction of third-time signal amplitude in ultrasonic solid delay lines has long been a major technical problem. Prior attempts to solve this problem have included (1) better acoustic impedance match within the transducer assembly (2) higher loss delay medium and (3) facet tilting. All methods have major disadvantages associated with them.

Generally speaking, the present prior art approach to obtain the best possible third time reduction includes the combined use of acoustic impedance matching by controlled bond thickness in addition to a high loss delay medium. In practice, however, a satisfactory acoustic impedance match is exceedingly difficult to obtain. Transducer assembly techniques are sufficiently critical, that consistently reproduceable low third-time signal levels using acoustic impedance matching techniques are rarely obtained.

To use a delay medium of higher than normal acoustic attenuation or, alternatively, to use an acoustic absorption device at the reflection facets of multiple reflection type delay lines, is not very desirable because it introduces an increased main signal attenuation of about ⅓ that obtained for the third time signal. Additionally, the pass band may also tend to be skewed downward.

The other method used by the prior art to reduce the third time signal is to tilt either the input or output facet of the delay line. However, using a conventional transducer assembly, this method has been noticeably unsuccessful. Its lack of success may be attributed primarily to the fact that any facet tilt angles, which are greater than several minutes, usually do not produce enough signal from the output transducer to warrant its use. This is due principally to the fact that when the input transducer is tilted, only a small fraction of the transmitted energy reaches the output transducer.

So too, does this method find a lack of success if the output transducer is tilted. If the main signal were made to arrive at an output transducer facet at an angle of incidence other than normal, only a very small portion of the signal could be used. The portion of the signal reflected from the transducer assembly, because of the existing impedance discontinuity, would, however, not be returned to the input transducer facet. Instead, this reflected energy would be thrown off at an identical angle on the other side of normal where it could be made to strike an acoustic absorber and be eliminated.

There is, however, another major deterrent to the use of the tilted output facet scheme on delay lines using conventional transducers. It has been found that the length of a conventional transducer is such that a plane wave arriving at any angle other than normal to the facet will not excite the total length of the transducer with the same phase. The phase difference from one end to the other of the transducer could approach $\pi$ radians in which case, the integrated electrical signal would approach zero.

My invention contemplates the utilization of a transducer assembly capable of producing a sensitivity pattern having two well defined major lobe intensity maxima which are not normal to the plane of the transducer, and a tilting of the transducer facet. For the mode of transducer lobe formation it is only necessary to resort to simple antenna theory. Specifically, an antenna which is electrically one wave length long will exhibit major intensity lobes located symmetrically about a plane perpendicular to the center of the wire. This phenomenon occurs due to the fact that there is a 180° difference between the instantaneous phase of the current in each half wave section of the antenna. The antenna then exhibits zero response along the perpendicular planes.

A somewhat similar lobe or sensitivity pattern results from the use of two adjacent transducer assemblies, excited electrically in such a manner that the instantaneous particle motions at each forward or delay medium interface are 180° out of phase.

In my invention, two transducer assemblies are located side by side and are driven 180° out of phase so that the instantaneous particle motion at the forward surface of one transducer section is 180° out of phase with the instantaneous particle motion at the forward surface of the other transducer section. This produces a sensitivity pattern having two energy lobes, each of which is disposed on opposite sides of a plane that is normal to the major surfaces of the delay line and normal to the facet. Additionally, the transducer facet of the delay line is tilted so that only one of the two resulting beams or energy lobes is directed to the output transducer or traverses the same path that the signal would take if the facet were not tilted and if the transducer were not split. The output transducer may be a conventional transducer assembly or alternatively, may also be a dual beam transducer receiving assembly on an appropriately tilted facet.

The energy in the unused beam radiated by the input transducer may then be appropriately directed to a suitable absorbing medium or may otherwise be allowed to become lost.

Therefore, it is an important object of the present invention to produce a delay line wherein the transducer assembly produces a sensitivity pattern that has a major lobe intensity maximum which is not normal to the plane of the transducer mounted on a tilted transducer facet.

The features of my invention which I believe to be novel are set forth in particularity in the appended claims. My invention itself, however, both as to its organization and method of operation, together with further objects and advantages thereof, may best be understood by reference to the following description taken in conjunction with the accompanying drawings in which:

As is well known in the art, when an electric field is applied to a transducer operating in its thickness-compressional mode, the transducer will naturally expand and contract in a plane parallel to its poled axis.

In the explanation of the foregoing figures, it is to be understood that where the polarity of the instantaneous electric field applied across a transducer section is in opposition to the indicated poled field or axis, then the two are said to be bucking and the net result is a contraction of the transducer section. This is indicated by an arrow pointing toward the transducer section. When the polarity of the instantaneous electric field applied across the transducer section aids, or is similar to the indicated poled field or axis, then the two are said to be aiding and the net result is an expansion of the transducer section. This is indicated by an arrow leading away from the transducer section.

Also, the poled axis of each transducer section will be indicated by an arrow wherein the positive polarity side of the transducer section is indicated by a plus sign at an arrow head, and the negative polarity side of the transducer section is indicated by a minus sign at the other end of the arrow.

In the description of the foregoing figures similar elements are similarly numbered.

Figure 1:
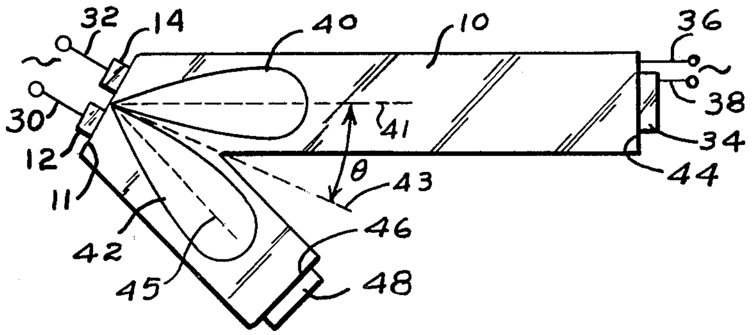
FIG. 1 represents an exaggerated plan view of a solid ultrasonic delay line medium embodying the principles of my invention.

Referring now to FIG. 1, I have therein depicted a delay line 10 having transducer sections 12 and 14 mounted on facet 11 and connected in accordance with my invention. Leads 32 and 30 connect a source of energy to transducer sections 14 and 12 respectively. Mounted on output facet 44 is a conventional transducer 34 having leads 36 and 38 attached thereto. Also, absorber facet 46 is shown with a suitable absorber material 48 disposed thereon.

In accordance with my invention, as will be hereinafter described, input transducer sections 12 and 14 are poled and interconnected in such a manner as to be driven 180° out of phase. By so doing, the input transducer assemblies may be considered as an anisotropic source of radiation to produce a sensitivity pattern having energy lobes 40 and 42. These are the typical "constant energy" lobes that are usually plotted on a polar-coordinate graph but, for convenience, these energy lobes have been superimposed on delay line 10.

Having generated energy lobes 40 and 42, wherein major axis 41 of lobe 40 is disposed at angle $\theta$ on one side of plane 43 normal to facet 11, it will be seen that if facet 11 is tilted from a plane normal to a "prescribed" path by an amount equal in magnitude to angle $\theta$, the energy propagated in lobe 40 will traverse the delay line along the "prescribed" path to produce a signal at output facet 44 and output transducer 34.

The "prescribed" path may be defined as that path along which energy has been designed to travel through a delay line, to produce the required delay time.

However, any energy reflected from facet 44 back to facet 11, for the second path of the prior discussed third time signal, will be reflected from facet 11 in a direction of major axis 45 of lobe 42, to be appropriately absorbed by absorbing material 48 on facet 46.

Figure 2:
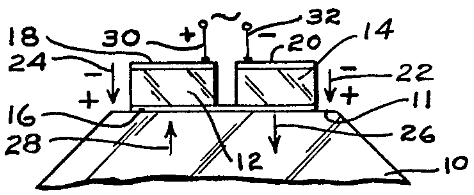
FIG. 2 represents a partial plan view of one embodiment of my invention showing similarly poled transducers in series connection.

Referring now to FIG. 2, I have therein depicted a delay line 10 having a tilted input facet 11. Bonding material 16, which may be any of the bonding materials familiar to the art, is used to bond transducer sections 12 and 14 to facet 11. Transducer section 12 has a poled axis as indicated by arrow 24 and transducer section 14 has a similarly poled axis as indicated by arrow 22. Associated with transducer section 12 is backing 18 which may be any of many well-known backing materials, while associated with transducer section 14 is a similar backing material 20. Leads 30 and 32 apply the input voltage to transducer sections 12 and 14 respectively through conductive backing material 18 and 20.

Thus, transducer sections 12 and 14 are connected in series through the comomn bonding material 16.

Assuming that the instantaneous input polarity is as indicated by the plus and minus symbols on leads 30 and 32 and the poled axis of each section is as indicated by arrows 24 and 22, it will be seen that the instantaneous electric field applied across transducer section 12 opposes its poled axis 24 resulting in a contraction as indicated by arrow 28. Transducer section 14, with its indicated poled axis 22, is in the proper phase relation to produce an expansion, as indicated by arrow 26. Thus, the original premise is satisfied in that two transducer assemblies, located side by side, are driven in such a manner that the instantaneous particle motion on the forward surface of one transducer section is 180° out of phase with the instantaneous particle motion on the forward surface of the other transducer section and I have thus produced two lobes as indicated in FIG. 1.

Figure 3:
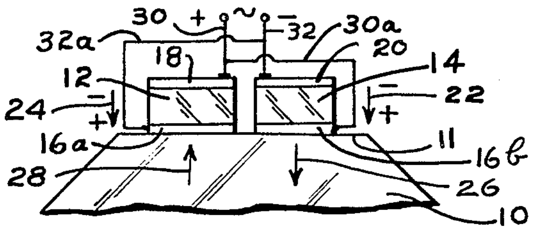
FIG. 3 represents a partial plan view of another embodiment of my invention showing similarly poled transducers in parallel connection.

Referring now to FIG. 3, I have therein depicted two sections 12 and 14 bonded to facet 11 of delay line 10 through bonding media 16*a* and 16*b* respectively. In this embodiment, backing material 18 is connected through lead 30 to the input terminal having an instantaneous positive polarity voltage thereon. The same positive polarity voltage is also applied to bond 16*b* by means of lead 30*a*. Input lead 32, which has an instantaneous negative polarity voltage thereon, is connected to backing material 20. Bonding material 16*a* which is connected to input lead 32 by means of lead 32*a* will also have an instantaneous negative polarity voltage applied thereto. Thus, assuming the poled axis of the respective sections as indicated by arrows 24 and 22, it will be seen that the instantaneous electric field applied across section 12 opposes its poled axis to produce a contraction as indicated by arrow 28. The instantaneous electric field applied across section 14 is in an aiding relation to the indicated poled axis and therefore, will produce an expansion as indicated by arrow 26. Thus, in this embodiment too, the original premise has been satisfied in that two transducer assemblies are driven in such a manner that the motion in both transducer sections are 180° out of phase with each other.

Figure 4:
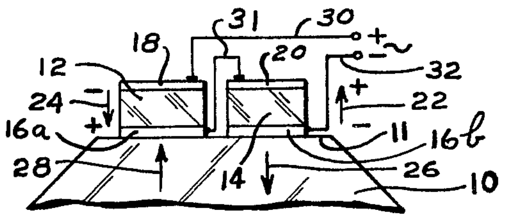
FIG. 4 represents a partial plan view of another embodiment of my invention showing oppositely poled transducers in series connection.

Referring now to FIG. 4, section 12, having the poled axis indicated by arrow 24, is bonded to facet 11 of delay line 10 through bonding material 16*a*. Similarly, section 14 is bonded to facet 11 of delay line 10 through bonding material 16*b* and has the poled axis indicated by arrow 22. Input lead 30 is connected to backing material 18, while lead 31 connects backing material 20 of section 14 to bonding material 16*a* of section 12. Input lead 32 is then connected to bonding material 16*b* of section 14. Thus, I have indicated a series connection for oppositely poled transducer sections in contradistinction with the similarly poled transducer sections of FIGS. 2 and 3. In this embodiment, the instantaneous electric field applied across section 12 is in opposition to the indicated poled axis (24) to produce a contraction in section 12 as indicated by arrow 28. Simultaneously, the instantaneous electric field applied across section 14 is in an aiding relationship to its poled axis (22) to produce an expansion in section 14 as indicated by arrow 26. Thus, here too, the original premise had been satisfied in that both transducer assemblies are driven in such a manner that the respective particle motions in each section are 180° out of phase with each other to produce two lobes.

Figure 5:
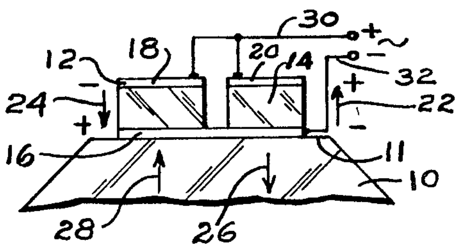
FIG. 5 represents a partial plan view of another embodiment of my invention showing oppositely poled transducers in parallel connection.

Referring now to FIG. 5, sections 12 and 14, having the polarity or poled axis indicated by arrows 24 and 22 respectively, are shown mounted on facet 11 of delay line 10 through the common bonding material 16. Backing material 18 associated with section 12 is connected to backing material 20 associated with section 14. The two sections are thus connected together and connected to input lead 30. The common bonding medium 16 is connected to input lead 32. Assuming again that the poled axis of section 12 is as indicated by arrow 24 and the poled axis of section 14 is as indicated by arrow 22, it will be seen that the instantaneous electric field applied across section 12 is in opposition to the poled axis (24) thus producing a contraction in section 12 as indicated by arrow 28. Simultaneously, the instantaneous electric field applied across section 14 is in aiding relationship to the poled axis (22) to produce an expansion in section 14 as indicated by arrow 26. Thus, it is again shown that both transducer assemblies have been driven in such a manner as to produce an instantaneous particle motion at the forward surface of one transducer section that is 180° out of phase with the instantaneous particle motion at the forward surface of the other transducer section.

Figure 6:
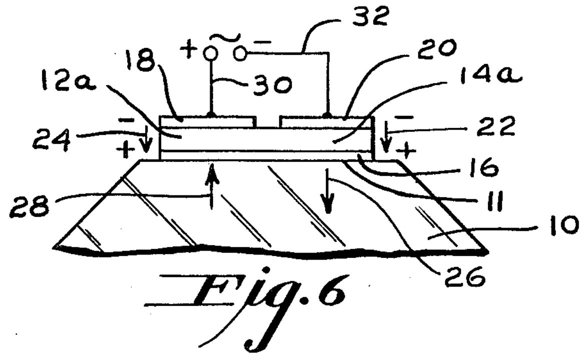
Figure 7:
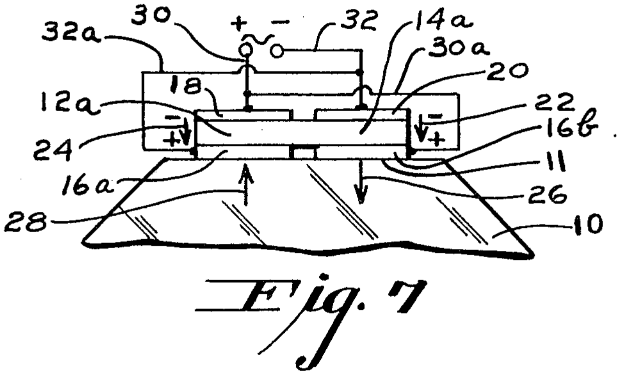

Referring now to FIGS. 6 and 7, I have therein depicted a transducer, in accordance with my invention, consisting of a unitary vibrating means. In both embodiments, I have produced a transducing means that is fully electrically equivalent to the embodiments of FIGS. 2–5. The unitary vibrating means may be made to perform as independent transducer sections by utilizing separate backing sections or a combination of separate backing sections with separate bonding sections.

In FIG. 6, a unitary vibrating means, consisting of transducing sections 12*a* and 14*a* is bonded to facet 11 of delay line 10 through bonding medium 16. Since the vibrating means is unbroken, it has been poled as a unit and has a poled axis as indicated by arrows 22 and 24. Input lead 30, having an instantaneous positive polarity voltage thereon is connected to section 12*a* which has backing material 18 attached thereto. Input lead 32 is similarly connected to section 14*a* which has backing material 20 attached thereto. Assuming the instantaneous input polarity is as indicated by the symbols at leads 30 and 32, it will be seen that the instantaneous electric field impressed across section 12*a* opposes the poled axis (24) resulting in a contraction of section 12*a* as indicated by arrow 28. Section 14*a*, having its poled axis (22) in the proper phase relation with the instantaneous electric field applied thereto, will produce an expansion as indicated by arrow 26. Thus, two transducer sections, as represented by a single vibrating means, are driven 180° out of phase with each other to produce the two lobes of FIG. 1.

Referring now to FIG. 7, I have therein depicted two transducer sections 12*a* and 14*a* as represented by a single vibrating means which is bonded to facet 11 of delay line 10 through bonding media 16*a* and 16*b*. In this embodiment, input lead 30, having an instantaneous positive polarity voltage thereon, is connected to backing material 18. The same positive polarity voltage is also applied to bond 16*b* by means of lead 30*a*. Input lead 32, which has an instantaneous negative polarity voltage thereon, is connected to backing material 20. Bonding material 16*a* is also connected to input lead 32 by means of lead 32*a* thus applying an instantaneous negative polarity voltage thereto. Assuming the poled field of the single vibrating means is as indicated by arrows 24 and 22, it will be seen that the instantaneous electric field applied across section 12*a* opposes the poled axis of this section (24) to produce a contraction as indicated by arrow 28. The instantaneous electric field applied across transducer 14 is in an aiding relation to its indicated poled axis (22) and therefore, will produce an expansion of section 14*a* as indicated by arrow 26. Thus, in this embodiment too, the original premise has been satisfied in that the transducer sections are driven 180° out of phase with each other.

Figure 8:
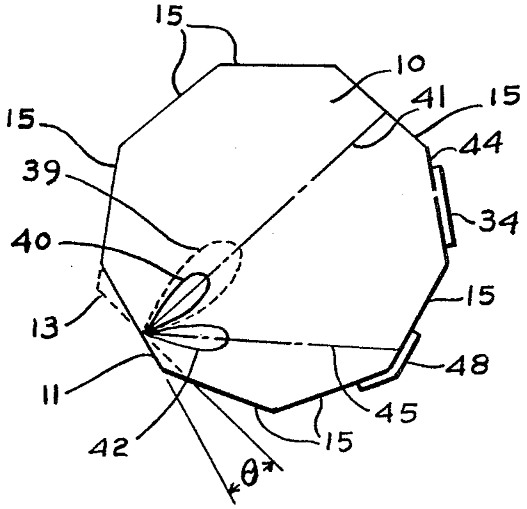

Referring now to FIG. 8, I have therein depicted the manner in which my split transducer, tilted facet device may be applied to the classic multiple path or folded delay line configuration. In this embodiment, the prior art input facet 13, having a conventional transducer thereon will produce a sensitivity pattern as indicated by the single lobe 39. Both facet 13 and lobe 39 are indicated at dotted lines for clarity. Utilizing my split transducer on tilted input facet 11 results in the generation of lobes 40 and 42. Having now generated the two lobes, facet 11 is shown as having been tilted by an amount equal to the angle between the major axis 41 of lobe 40 and a plane normal to facet 11, so that lobe 40 will now traverse the prescribed or design path. The signal is then reflected from facets 15 to arrive at output facet 44 appropriately delayed. Stop material or absorber 48 is appropriately placed on one of the facets 15 so that any energy propagated along major axis 45 of lobe 42 will be absorbed. To complete the device, output transducer 34 is shown mounted on facet 44.

Lobes 40 and 42 have thus far been depicted as having equal areas symmetrically disposed on either side of plane 43. This sensitivity pattern has been produced by utilizing equal size transducer sections having equal voltages applied to each section. If desired, two lobes of unequal areas may be generated by the expeditious use of unequal transducer sections or by driving equal transducer sections with unequal voltages. In any event, in addition to producing unequal area lobes, it will be apparent to those skilled in the art, that angle $\theta$ (FIG. 1) will also tend to decrease as one lobe gets larger. Since angle $\theta$ determines the angle at which the facet must be tilted, it is necessary to find the magnitude of this angle for each configuration or ratio of transducer splitting or for each condition of unequal drive where equal transducer sections are used.

One method of determining the magnitude of angle $\theta$ is to utilize a photoelastic technique similar to that outlined in U.S. Patent 2,418,964 issued to D. L. Arenberg on April 15, 1947. In this method, a transparent delay line blank is positioned in a polarimeter such as proposed by Arenberg, or its optical equivalent, and photographs are taken of the stress pattern resulting from the propagation of an acoustical signal by the transducer assembly in question. The stress pattern photographs will then readily show the lobe pattern and its disposition about a plane normal to the facet. The angle $\theta$ may be then determined from a direct measurement of the photograph.

While a formula may be derived for determining the angle $\theta$ for any given configuration of transducer splitting or condition of drive, the photoelastic method of determining the angle $\theta$ has a distinct advantage in that permanent records of each configuration may be maintained.

In manufacturing the embodiment of FIG. 2, wherein both transducer sections are similarly poled, a single vibrating means may be bonded to facet 11 of delay line 10 by means of bonding material 16 and a suitable backing applied thereto. The two transducer sections 12 and 14 are then formed by cutting through the backing material and the vibrating means, but stopping short of cutting completely through the bonding material 16.

In the embodiment of FIG. 3 the single vibratory means may be bonded, by means of material 16, to the delay line facet 11 of delay line 10 and an appropriate backing material applied thereafter. The entire assembly including backing material, vibratory means and bonding material may then be cut through completely and appropriate leads 32*a* and 30*a* applied to produce the parallel connection illustrated therein.

In all the embodiments disclosed herein, it has been found that previously unpoled transducers may be appropriately bonded to the delay line facet, have backing material applied thereto and then suitably poled.

The above embodiments have been disclosed in terms of having split transducer assemblies mounted on a tilted input facet. It will be readily seen by those skilled in the art that, due to the reciprocity that exists between a transmitting transducer (input) and a receiving transducer (output), the same split transducer assembly and tilted facet, when utilized at the output of the delay line will result in the same degree of third time attenuation despite the fact that the input may be generated by conventional transducer.

Splitting the output transducer produces a receiving sensitivity pattern for the receiving transducer that is almost identical to the transmitted pattern produced by the split transmitting transducer. Thus, a pair of receiving lobes similar to the transmitted energy lobes 40, 42 of FIG. 1 is associated with the receiving assembly, resulting in enhanced reception characteristics along the major axis of each lobe. Therefore, if a split transducer were mounted on a tilted output facet so that the axis of one receiving lobe were normal to the path of the received signal, that part of the signal reflected from the output facet would be prevented from returning to the input facet by being reflected therefrom and could not then manifest itself as a third time signal at the output facet. Instead, the portion of the received signal that is reflected from the output facet is reflected at a suitable angle so as to render it impossible to traverse the original path back to the input. Thus, the reflected signal can be readily absorbed by strategically placed absorber material.

While the foregoing embodiments, for reasons of simplicity of explanation, have been described in terms of the thickness-compressional mode of transducer operation, it will be appreciated by those skilled in the art that my device can be made to operate in any of the other known modes of transducer operation such as for example, the thickness-shear mode.

While I have described what is presently considered a preferred embodiment of my invention, it will be obvious to those skilled in the art that various changes and modifications may be made therein without departing from the inventive concept contained therein, and it is, therefore aimed in the appended claims to cover all such changes and modifications as fall within the true spirit and scope of my invention.

What is claimed is:

1. An improved ultrasonic delay line comprising a delay medium, input and output facets on said delay medium, first transducer means mounted on said input facet having a plurality of sections interconnected to be driven 180° out of phase with each other to produce in said medium a plurality of sensitivity lobes arranged about a first plane normal to the second plane of said input facet, each lobe having a maximum intensity in a direction between said first and second planes, second transducer means mounted on said output facet having a plurality of sections interconnected to produce in said medium a plurality of receiving sensitivity patterns 180° out of phase with each other arranged about a third plane normal to the fourth plane of said output facet, each pattern having a maximum sensitivity in a direction between said third and fourth planes, means directing one of said lobes along a prescribed path between said input and output facets, means mounted on said delay medium for absorbing the other of said lobes, and means directing one of said receiving sensitivity patterns along said prescribed path.

2. The device of claim 1 wherein each said first and second transducer means comprises a pair of similarly poled transducer sections.

3. The device of claim 1 wherein each said first and second transducer means comprises a pair of oppositely poled transducer sections.

4. The device of claim 1 where said first transducer means comprises a pair of similarly poled transducer sections and said second transducer means comprises a pair of oppositely poled transducer sections.

5. The device of claim 1 wherein said first transducer means comprises a pair of oppositely poled transducer sections and said second transducer means comprises a pair of similarly poled transducer sections.

6. An improved ultrasonic delay line comprising a delay medium having first and second divergent signal paths, an input facet on said delay medium at the intersecting ends of said paths, said paths being arranged about a first plane normal to the second plane of said input facet, an output facet on said delay medium at the other end of said first path, input signal means to provide an input signal, transducer means connected to said input signal means having a plurality of sections mounted on said input facet and interconnected to be driven 180° out of phase with each other to produce two sensitivity lobes in said medium arranged about said first plane along said paths, means directing one of said lobes along said first path to said output facet, absorber means mounted at the other end of said second path, and means directing the other of said lobes along said second path to said absorber means, whereby third-time signals will be caused to be reflected from said input facet along said second path to said absorber means.

7. An improved ultrasonic delay line comprising a delay medium, input and output facets on said delay medium, input signal means to provide an input signal, transducer means connected to said input signal means having a plurality of sections mounted on said input facet and interconnected to be driven 180° out of phase with each other to produce two sensitivity lobes in said medium arranged about a plane normal to the plane of said input facet, each lobe having a maximum intensity in a direction between said planes, means for directing one of said lobes along a prescribed path between said facets to said output facet, and absorber means mounted on said delay medium for absorbing the other of said lobes, whereby third-time signals will be caused to be reflected from said input facet to said absorber means.

8. The improved ultrasonic delay line of claim 7 wherein said transducer means comprise a pair of similarly poled transducer sections.

9. The improved ultrasonic delay line of claim 7 wherein said transducer means comprise a pair of oppositely poled transducer sections.

10. An improved ultrasonic delay line comprising a delay medium, input and output facets of said delay medium, input signal means mounted to said input facet to provide an input signal, transducer means having a plurality of sections mounted on said output facet and interconnected to produce two receiving sensitivity patterns in said medium 180° out of phase with each other arranged about a plane normal to the plane of said output facet, each pattern having a maximum sensitivity in a direction between said planes, means for directing one of said receiving sensitivity patterns along a prescribed path between said facets to said input facet, absorber means mounted on said delay medium, and means directing the other of said sensitivity patterns along a path between said output facet and said absorber means, whereby that portion of said input signal which would otherwise become a third time signal will be caused to be reflected from said output facet to said absorber means.

11. The improved ultrasonic delay line of claim 10 wherein said transducer means comprise a pair of similarly poled transducer sections.

12. The improved ultrasonic delay line of claim 10 wherein said transducer means comprise a pair of oppositely poled transducer sections.

References Cited in the file of this patent

UNITED STATES PATENTS

| | | |
|---|---|---|
| 2,421,026 | Hall | May 27, 1947 |
| 2,628,335 | Drake | Feb. 10, 1953 |
| 2,659,869 | Allison | Nov. 17, 1953 |
| 2,672,590 | McSkimin | Mar. 16, 1954 |
| 2,777,997 | Arenberg | Jan. 15, 1957 |
| 2,826,744 | Arenberg | Mar. 11, 1958 |
| 2,965,851 | May | Dec. 20, 1960 |
| 2,985,009 | Henry | May 23, 1961 |
| 3,025,479 | Wolfskill | Mar. 13, 1962 |